(12) United States Patent
Wu et al.

(10) Patent No.: US 8,813,206 B2
(45) Date of Patent: Aug. 19, 2014

(54) ANONYMOUS PERSONAL CONTENT ACCESS WITH CONTENT BRIDGE

(71) Applicant: Hong Kong Applied Science and Technology Research Institute Company Limited, Hong Kong (HK)

(72) Inventors: Chi Kong Wu, Hong Kong (HK); Minghua Shi, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 0 days.

(21) Appl. No.: 13/686,890

(22) Filed: Nov. 27, 2012

(65) Prior Publication Data

US 2014/0150078 A1 May 29, 2014

(51) Int. Cl.
*G06F 21/41* (2013.01)

(52) U.S. Cl.
CPC .................................. *G06F 21/41* (2013.01)
USPC ........................................................... 726/8

(58) Field of Classification Search
None
See application file for complete search history.

(56) References Cited

U.S. PATENT DOCUMENTS

| | | | |
|---|---|---|---|
| 5,815,665 A * | 9/1998 | Teper et al. .................... 709/229 |
| 7,487,539 B2 * | 2/2009 | Ramachandran et al. ...... 726/10 |
| 7,925,593 B2 | 4/2011 | Davidson |
| 8,136,150 B2 | 3/2012 | Hayler et al. |
| 2004/0002878 A1 | 1/2004 | Maria Hinton |
| 2006/0185004 A1 | 8/2006 | Song et al. |
| 2006/0235948 A1 * | 10/2006 | Bjornestad et al. ........... 709/219 |
| 2006/0271689 A1 | 11/2006 | Kikuchi |
| 2007/0240206 A1 | 10/2007 | Wu et al. |
| 2007/0289006 A1 | 12/2007 | Ramachandran et al. |
| 2009/0037517 A1 | 2/2009 | Frei |
| 2011/0119747 A1 | 5/2011 | Lambiase |
| 2011/0225643 A1 | 9/2011 | Faynberg et al. |

* cited by examiner

*Primary Examiner* — Jeffrey Pwu
*Assistant Examiner* — Wasika Nipa
(74) *Attorney, Agent, or Firm* — Ella Cheong Hong Kong; Sam T. Yip

(57) ABSTRACT

An online content publishing and consumption environment can be modeled such that communities of content consumers (users), such as educational institutes and libraries, are categorized as Content Brokers; content providers, such as book, music, and multimedia publishers, and news sources, are categorized as Content Providers; and a Content Bridge, a standalone component providing the functionalities of the presently claimed invention in the online content publishing and consumption environment. The Content Bridge allows a simpler and loosely-coupled integration with lowered integration cost and effort, as the Content Broker is required to integrate once only with the Content Bridge instead of having to integrate individually with every Content Provider.

10 Claims, 4 Drawing Sheets

ANONYMOUS PERSONAL CONTENT ACCESS WITH CONTENT BRIDGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to networking and electronic content publishing and retrieval technologies. Specifically, the present invention relates to networked online content access and single-sign-on technologies.

BACKGROUND

A user often needs to access online contents provided by a number of different content providers in the Internet. Often some of these content providers require user authentication and authorization before granting accesses to its contents. For example, a content provider allows accesses to its privileged contents only to paid subscribers, as such it requires a user to authenticate and identify herself as a paid subscriber.

For a heavy content consumer subscribed to many different content providers, having to establish an account in each content provider and authenticate each time for content access in each content provider is a highly redundant and inconvenient activity. Some existing solutions provide content aggregator portals aggregating online contents from disparate content providers into a single online asset or web site. This way, the content consumer needs only one account and one-time authentication at the content aggregator portal. Other variations of content aggregating solution place the content aggregator at the content consumer's client computing device, for example the browser. However, these content aggregator solutions require tight-coupling integrations with the content providers that are expensive and complicated. Also, user authentication credentials must still be established for each content provider and stored in the content aggregator.

Still some other existing solutions use some forms of a dedicated single-sign-on (SSO) system, in which a primary authentication system is used to store and manage user accounts and provide authentications and authorizations to the users. In these SSO systems, trusted logged-in sessions are maintained for logged-in users and are propagated to the integrated content providers as the logged-in users access them. The integrated content providers rely on the trusted logged-in sessions in permitting user accesses without presenting authentication challenges, thus achieving the single-sign-on functionality. However, these solutions also require tight-coupling integrations with the content providers that are expensive and complicated.

SUMMARY

It is an objective of the presently claimed invention to provide a method and system that enables an online user to access one or more online contents from one or more different content providers anonymously or using a single online identity. It is a further objective to provide such method and system that the online user, after being recognized and authenticated by one community system, is authorized to access the one or more online contents from the one or more different content providers without being challenged for authentication at each of the one or more different content providers. It is still a further objective that such method and system utilize open standard for online user authentication and authorization; wherein the authorization methods are asymmetrical, enabling secure content access; and wherein the authentication uses private OpenID, enabling social-network functionalities.

In accordance to one embodiment, an online content publishing and consumption environment can be modeled such that communities of content consumers (users), such as educational institutes and libraries, are categorized as Content Brokers; content providers, such as book, music, and multimedia publishers, and news sources, are categorized as Content Providers; and a Content Bridge, a standalone component providing the functionalities of the presently claimed invention in the online content publishing and consumption environment. The Content Bridge allows a simpler and loosely-coupled integration with lowered integration cost and effort, as the Content Broker is required to integrate once only with the Content Bridge instead of having to integrate individually with every Content Provider.

BRIEF DESCRIPTION OF THE DRAWINGS

Embodiments of the invention are described in more detail hereinafter with reference to the drawings, in which.

DETAILED DESCRIPTION

In the following description, methods and systems for accessing, as an anonymous user, one or more online contents from one or more different content providers and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
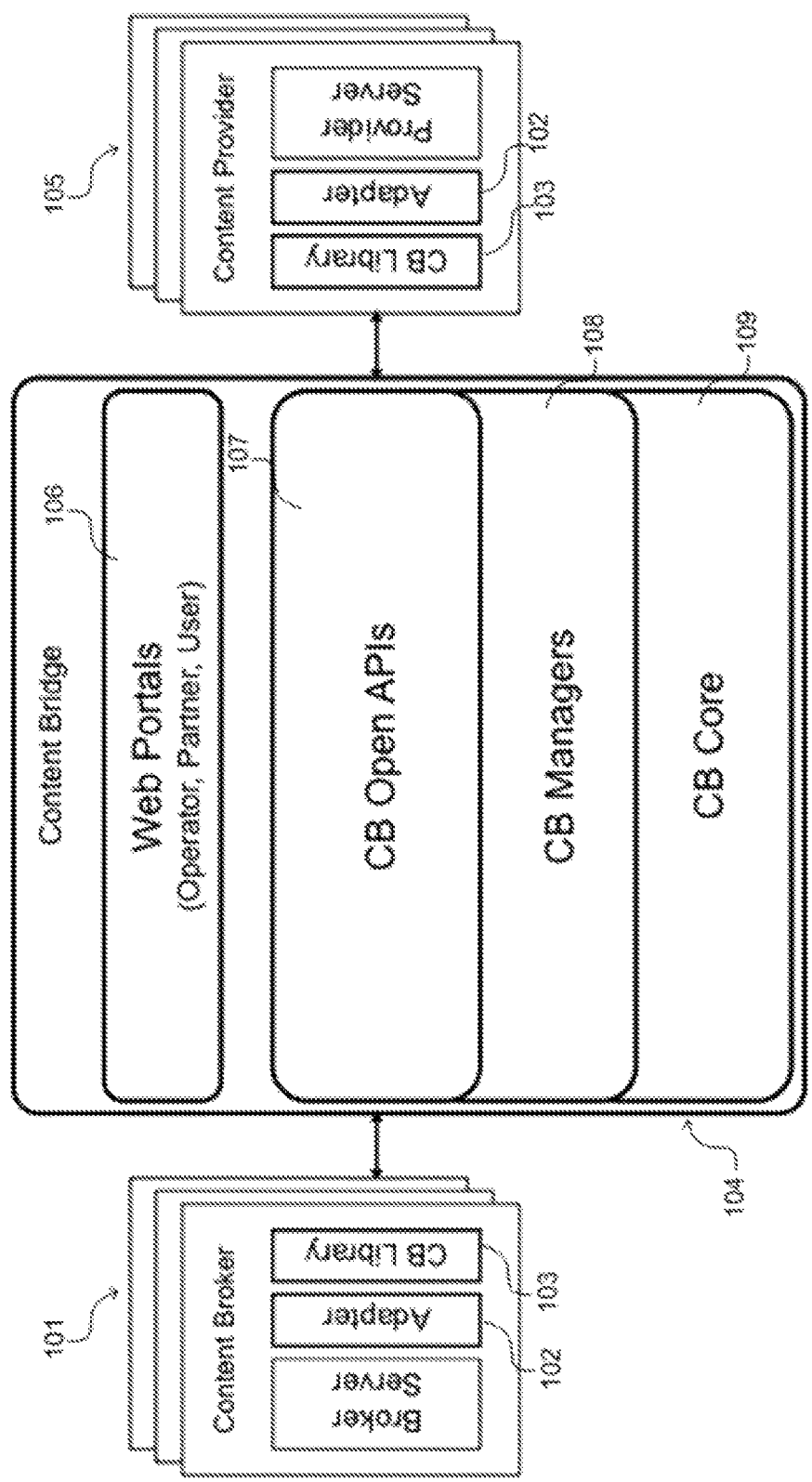
FIG. 1 shows a block diagram illustrating the logical architecture of the computer instruction or software code modules in accordance to an embodiment of the presently claimed invention.

Referring to FIG. 1. In accordance to various embodiments, the presently claimed invention comprises one or more computer instruction or software code modules being executed by one or more processing servers collectively executing all the modules in each processing server, individually executing one or more of the modules in each processing server, or in combinations thereof. The one or more computer instruction or software code modules include: an Adapter (102), a Content Bridge (CB) Library (103), and a Content Bridge (104).

In accordance to one embodiment, the online content publishing and consumption environment can be modeled such that communities of content consumers (users), such as educational institutes and libraries, categorized as Content Brokers (101); content providers, such as book, music, and multimedia publishers, and news sources, categorized as Content Providers (105); and the Content Bridge (104), a standalone component providing the functionalities of the presently claimed invention in the online content publishing and consumption environment.

Each Content Provider (105) and Content Broker (101) incorporates the Adapter (102) module, which is an interfacing computer instruction or software code that facilitates the data exchanges and invocations of computer instruction or software code functions between the Content Broker/Content Provider's computer instruction or software code and the CB Library (103). Each Content Provider (105) and Content Broker (101) also incorporates the CB Library (103) module, which is an interfacing computer instruction or software code that facilitates the data exchanges and invocations of computer instruction or software code functions between the Content Broker/Content Provider and the Content Bridge (104).

The computer instruction or software code of the Content Broker/Content Provider interacts with the CB Library (103) via the Adapter (102). Among other functionalities, the CB Library (103) provides a set of functions enabling the registration of a Content Broker (101) or Content Provider (105) at the Content Bridge (104), wherein such registration results in a set of values to be retained by the Content Broker (101) or Content Provider (105) and the Content Bridge (104) for user authentication and authorization. The Adapter (102) and the CB Library (103) modules can be integrated within and executed by the Content Broker/Content Provider's one or more processing servers.

The Content Bridge (104) comprises one or more sub-modules including one or more Web Portals (106), one or more Open Application Program Interfaces (APIs) (107), one or more Managers (108), and a Core (109). The Web Portals (106) include one or more user interfaces, wherein the user interfaces are accessible and displayable by users, system operators, and administrators through the use of a client computing device running a typical browser application software program or any application software program conforming to the common data transmission protocols such as TCP/IP, HTTP, and HTML. The Web Portals user interfaces can be grouped into Operator Portal, User Portal, and Partner Portal. The Operator Portal comprises user interfaces for Content Bridge system operators and administrators to perform Content Broker and Content Provider (partners) management, order management, user management, content management, and statistics compilation, retrieval, and analysis. The User Portal comprises user interfaces for users to manage their own profiles, perform social-networking functions, such as online web logs (blogs) posting, commenting online posting commenting and sharing, and perform content-related functions, such as content searching, previewing, and purchasing. The Partner Portal comprises user interfaces for Content Broker and Content Provider system operators and administrators to perform registration management, order management, and statistics compilation, retrieval, and analysis.

The Open APIs (107) are a set of computer instructions or software codes with defined exposed invocation points for performing certain functions upon invocations. The functions provided by the Open APIs (107) include, but not limited to, user authentication, content-related functions such as content searching and browsing, content-access-related functions such as content previewing and retrieval, content-purchase-related functions such as order placement, reviewing, and management, and social-networking functions, such as online web logs (blogs) posting, commenting online posting commenting and sharing.

The Managers (108) are a set of computer instructions or software codes that handle requests of data exchanges and computer instruction or software code function invocations from the Open APIs (107). The Managers (108) also manage data entities with defined application logic.

The Core (109) comprises a database with a defined data model, wherein the defined data model comprises at least the following data entities:

| Data Entities | Attributes/Definitions |
| --- | --- |
| Account | Attributes including Broker ID, private OpenID, and ID mapping. |
| User | Attributes including User Type (value can be Instructor, Teacher, Parent, Student, Group Leader, or Group Member), Relationship (value can be Teacher-Student, Parent-Student, or Friend), and Reading List. |
| Content Auxiliary Information | Attributes including Category, Statistics, Comments, and Rating. |
| Order | |
| Partner | Attributes including Broker (value can be School, Institute, or Library), and Provider (value can be Publisher, Music/Video Provider) |

Figure 2:
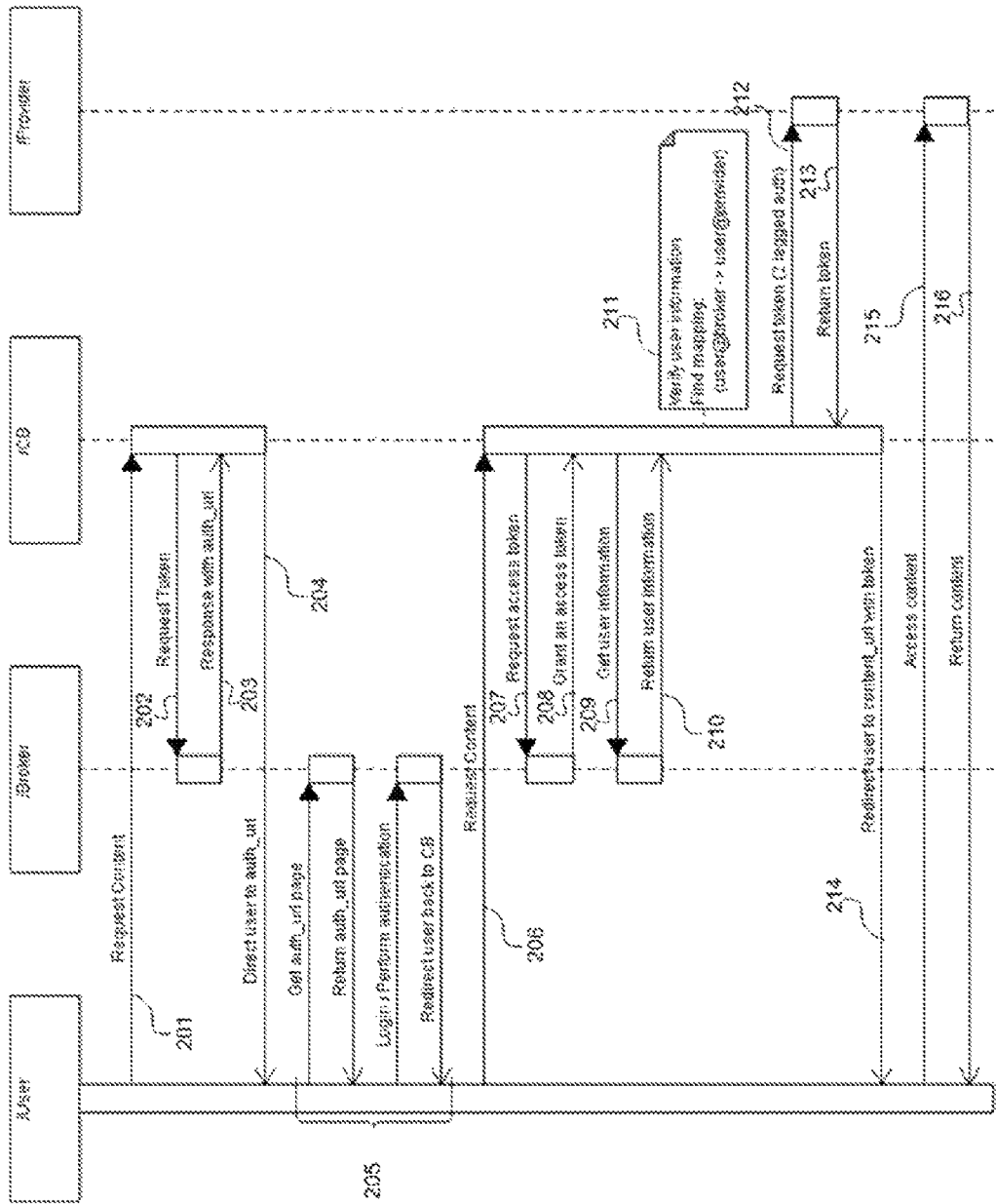
FIG. 2 shows a sequence diagram of a user accessing contents anonymously in accordance to an embodiment of the presently claimed invention.

Referring to FIG. 2. In accordance to one embodiment of the presently claimed invention, the content access process comprises: a user of one of the Content Brokers accessing and viewing a User Portal user interface rendered by the Content Bridge and requesting to access an online content (201); the Content Bridge requesting from the Content Broker a first access token for the user (202); since the user has not yet authenticated, the Content Broker responding with an indication for authentication and an authentication URL (203); the Content Bridge redirecting the user to a user interface accessible at the authentication URL (204), wherein the user interface accessible at the authentication URL being hosted by the Content Broker; the user authenticating by using his/her credential previously determined and preserved at the Content Broker (205), wherein the authentication step being conformed to the HTTPS standard for enhanced security; upon successful authentication, the user again requesting to access the online content (206); the Content Bridge requesting from the Content Broker the first access token for the user (207); since the user has been authenticated, the Content Broker responding with the first access token for the user (208); the Content Bridge further requesting user information from the Content Broker (209), wherein the user information including a first user identifier associating the user to the Content Broker; the Content Broker responding with the user information (210); the Content Bridge performing an ID mapping method step mapping the first user identifier associating the user to the Content Broker to a second user identifier associating the user to the Content Provider providing the online content requested, wherein both the first user identifier and the second user identifier have been previously established and preserved by the Content Bridge (211); with the second user identifier the Content Bridge requesting a second access token from the Content Provider (212); the Content Provider responding with the second access token (213); with the second access token, the Content Bridge redirecting the user to a user interface accessible at a content URL where the online content requested is available (214); the user accessing the content URL along with the second access token (215);

the Content Provider, upon receiving the content access request with the second access token, returning the online content requested (216).

Figure 3:
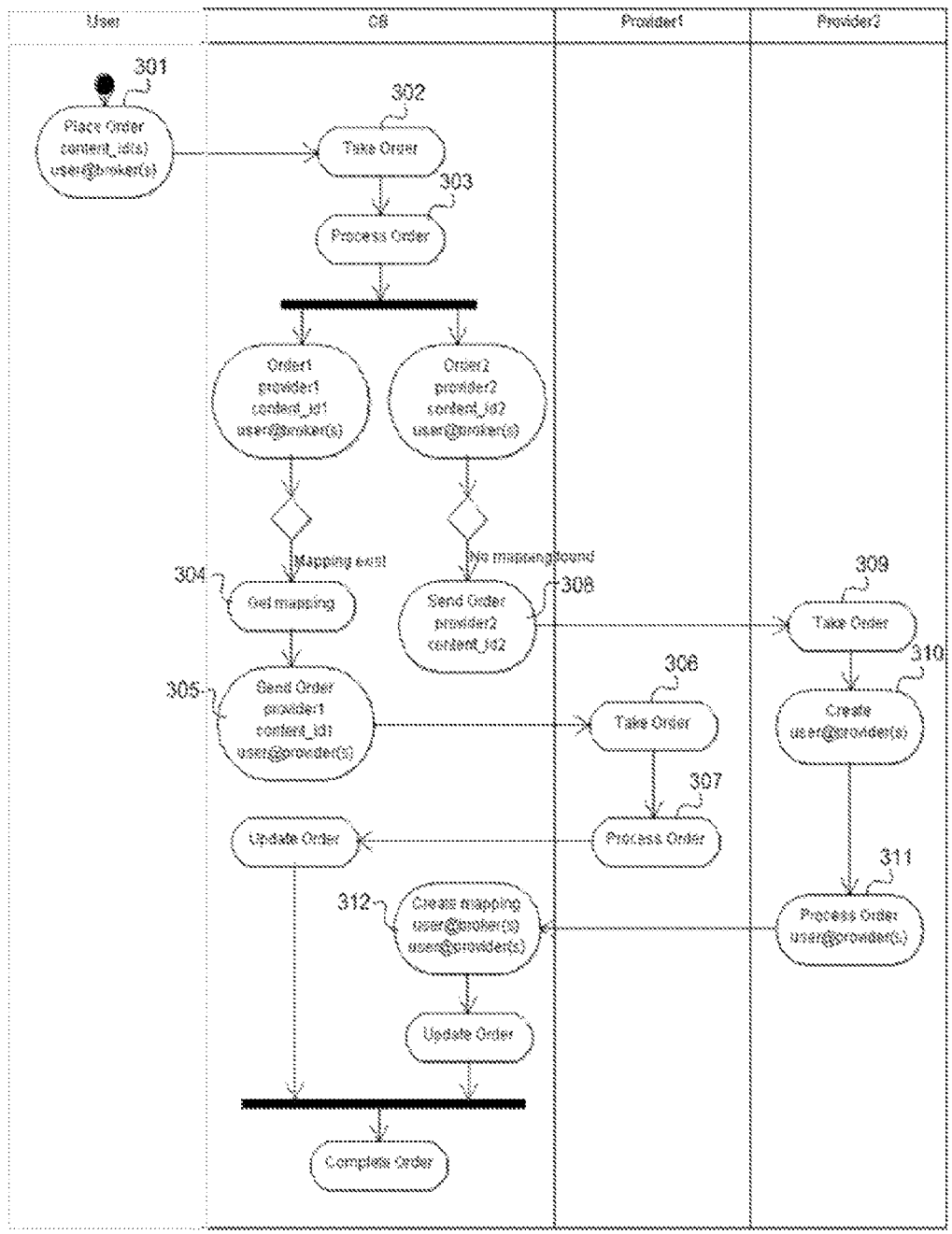
FIG. 3 shows a use case diagram of a use case of online content ordering from two Content Provider, highlighting the ID mapping function of the Content Bridge in accordance to an embodiment of the presently claimed invention.
Figure 4:
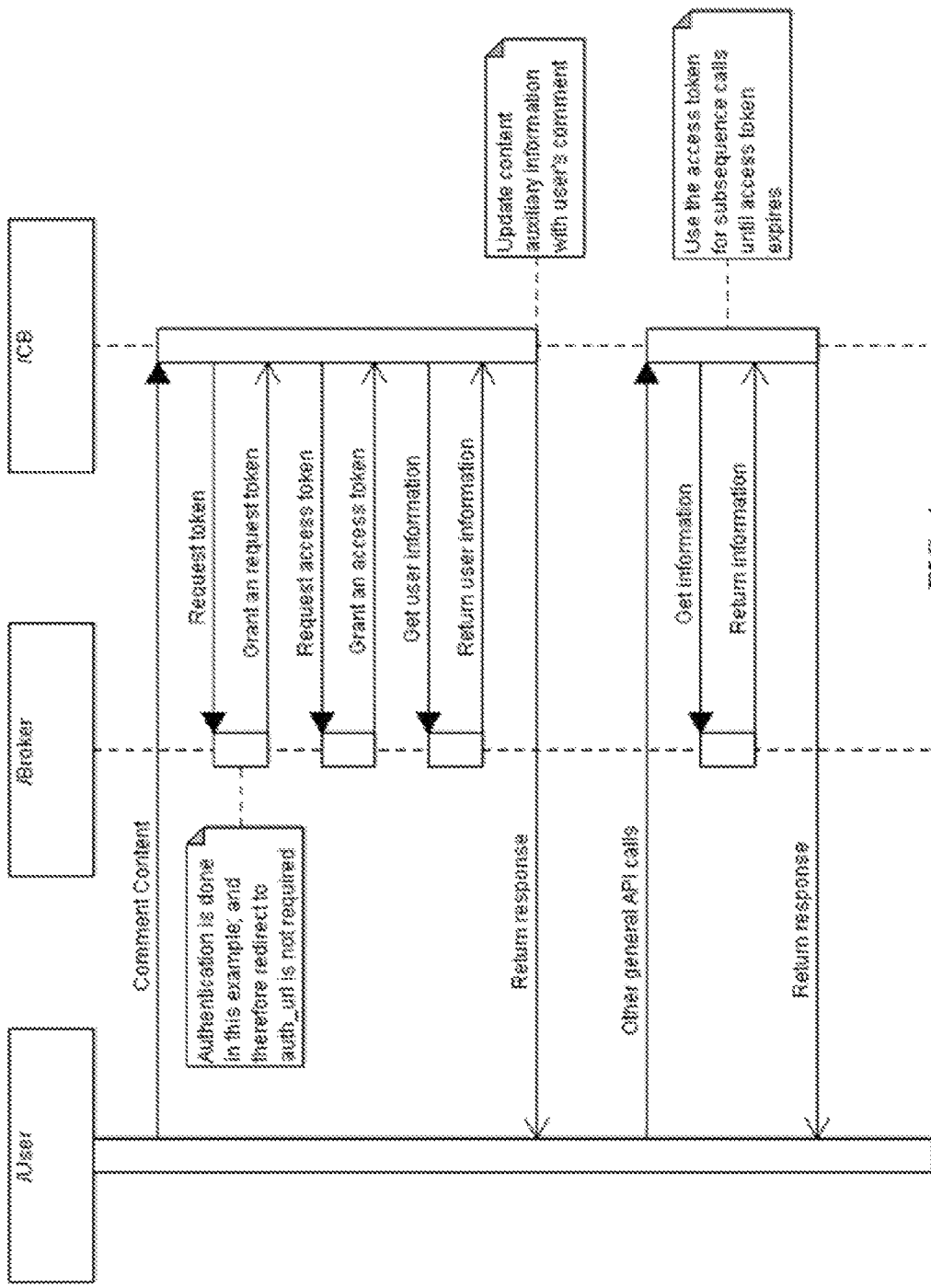
FIG. 4 shows a sequence diagram of a user commanding general functions of the Content Bridge in accordance to an embodiment of the presently claimed invention.

Referring to FIG. 3. To demonstrate the method step of ID mapping, an exemplary use case a user ordering online contents via a Content Bridge is used. In this exemplary use case, a teacher (user) of a school (a Content Broker previously registered with the Content Bridge) is placing a purchase order of online contents. The purchase order consists of online contents from two Content Providers: Content Provider 1 and Content Provider 2, thus the purchase order is split into two sub-orders. While the user has previously made purchases at Content Provider 1, she has never purchased anything from Content Provider 2, thus never has established an account with Content Provider 2.

The use case starts by the user placing the purchase order of online contents (301), wherein the purchase order is attached with content identifiers and a first user identifier associating the user to Content Broker; the purchase order data being received by the Content Bridge (302); the purchase order data being processed (303), resulting in two sub-orders: Order 1 and Order 2, wherein Order 1 is for content 1 and is attached with a first provider identifier associating with Content Provider 1 and, wherein Order 2 is for content 2 and is attached with a second provider identifier associating with Content Provider 2; the Content Bridge performing an ID mapping method step mapping the first user identifier to a second user identifier associating the user to Content Provider 1, wherein both the first user identifier and the second user identifier have been previously established and preserved by the Content Bridge (304); the Content Bridge then sending Order 1, attached with the second user identifier, to Content Provider 1 (305); Content Provider 1 receiving Order 1 (306) and processing Order 1 (307) and responding with a transaction result; in parallel steps 304-307, the Content Bridge failing to perform an ID mapping method step mapping the first user identifier to a user identifier associating the user to Content Provider 2, consequently sending Order 2 to Content Provider 2 without any user identifier (308); Content Provider 2 receiving Order 2 (309); Content Provider 2 creating a third user identifier (310); Content Provider 2 processing Order 2 and responding with a transaction result along with the third user identifier (311); the Content Bridge receiving the transaction result and the third user identifier and creating a new mapping for the first user identifier and third user identifier (312).

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for accessing online contents, comprising:
a content broker processing server belonging to a content broker for authenticating the one or more users, and maintaining one or more first user identifiers each uniquely associating each user to the content broker, and wherein the content broker processing server comprising:
   a content bridge library module for facilitating data exchanges and invocations of computer instruction functions between the content broker processing server and a content bridge processing server;
the content bridge processing server for providing one or more user interfaces allowing the one or more users to perform content-related functions including searching, previewing, and purchasing on the online contents; and
one or more content provider processing servers for providing the online contents, wherein each of the one or more content provider processing servers comprising the content bridge library module, and wherein each or group of the one or more content provider processing servers belonging to a different content provider in a group of one or more content providers;
wherein the online contents comprise one or more different online contents provided by a different content provider in a group of one or more content providers;
wherein each content provider in the group of one or more content providers maintains its one or more second user identifiers each uniquely associating each user to the content provider;
wherein the content bridge processing server is accessible by the one or more users for requesting access of the online contents;
wherein the content bridge processing server is accessible to the content broker processing server for requesting the one or more first user identifiers, and is accessible to the each content provider for requesting the one or more second user identifiers;
wherein the content bridge processing server is accessible to the one or more content providers for requesting them to provide the online contents requested by the one or more users;
wherein the content bridge processing server maintains a map of the first user identifiers and the second user identifiers;
wherein the content bridge processing server performs an ID mapping process mapping the first user identifier of each user to each second user identifier associating the user to each content provider by using the map of the first user identifiers and the second user identifiers;
wherein the map of the first user identifiers and the second user identifiers is inaccessible to the content providers such that identities of the users are hidden to the content providers, enabling an asymmetrical authorization and secure content access for the users; and wherein the content bridge processing server is a standalone component integrating with the content broker processing server and each of the one or more content provider servers such that the content broker is required to integrate once only with the content bridge processing server instead of having to integrate individually with every content provider in the group of the one or more content providers.

2. The system of claim 1, wherein the content bridge processing server further comprises:
   one or more operator user interfaces for system operators to perform partner management, order management, user management, content management, and statistics compilation, retrieval, and analysis;
   one or more user interfaces for users to manage profiles, perform social-networking functions; and
   one or more partner user interfaces for partner system operators and administrators to perform registration management, order management, and statistics compilation, retrieval, and analysis.

3. The system of claim 1, wherein the content bridge processing server further comprises one or more application programming interfaces (APIs) for allowing invocation of functions including user authentication, content-related functions including content searching and browsing, content-access-related functions including content previewing and retrieval, content-purchase-related functions including order placement, reviewing, and management, and social-networking functions.

4. The system of claim 1, wherein the content broker processing server further comprises an adapter module for facilitating data exchanges and invocations of computer instruction functions between the content broker processing server computer instructions and the content bridge library module.

5. The system of claim 1, wherein each of the one or more content provider processing servers further comprises an adapter module for facilitating data exchanges and invocations of computer instruction functions between the content broker processing server computer instructions and the content bridge library module.

6. The system of claim 1, wherein the ID mapping process comprises:
   determining, by the content broker processing server, the first user identifier for the user upon successful authentication at the content broker processing server;
   sending, by the content broker processing server, the first user identifier to the content bridge processing server;
   if the user has not yet established a second user identifier associating the user to the content provider providing the online content of which the user is accessing, then:
      sending, by the content bridge processing server, a transaction request to the one or more content provider processing servers belonging to the content provider providing the online content of which the user is accessing;
      receiving and processing, by the one or more content provider processing servers belonging to the content provider, the transaction request;
      creating, by the one or more content provider processing servers belonging to the content provider, the second user identifier associating the user to the content provider providing the online content of which the user is accessing;
      responding, by the one or more content provider processing servers belonging to the content provider, the second user identifier associating the user to the content provider providing the online content of which the user is accessing;
      receiving, by the content bridge processing server, the second user identifier associating the user to the content provider providing the online content of which the user is accessing; and
      storing in a map mapping to the first user identifier, by the content bridge processing server, the second user identifier associating the user to the content provider providing the online content of which the user is accessing;
   otherwise then:
      mapping and determining from the first user identifier, by the content bridge processing server, the second user identifier associating the user to the content provider providing the online content of which the user is accessing;
      requesting, by the content bridge processing server, an access token based on the second user identifier associating the user to the content provider providing the online content of which the user is accessing;
      sending, by the content bridge processing server, a transaction request, with the access token, to the one or more content provider processing servers belonging to the content provider providing the online content of which the user is accessing; and
      receiving and processing, by the one or more content provider processing servers belonging to the content provider, the transaction request.

7. A computer implemented method for accessing online contents, comprising:
   receiving, by a content bridge, a request for online content accesses from a user;
   authenticating, by a content broker, the user;
   determining, by the content broker, a first user identifier of the user;
   determining, by the content bridge, one or more content providers providing the online contents of which the user is accessing from the request for online content accesses;
   performing, by the content bridge, an ID mapping process by using a map of one or more first user identifiers and one or more second user identifiers, and determining a second user identifier of the user for each of the one or more content providers determined, wherein the map of the first user identifiers and the second user identifiers is established and preserved by the content bridge, the first user identifiers are provided by the content broker, and the second user identifiers are provided by the one or more content providers;
   sending, by the content bridge, to each of the one or more content providers determined the request for online content accesses along with the second user identifier of the user for each of the one or more content providers determined; and
   receiving and processing, by each of the one or more content providers determined, the request for online content accesses;
   wherein the map of the first user identifiers and the second user identifiers is not accessible to the content providers such that identities of the users are hidden to the content providers, enabling an asymmetrical authorization and secure content access for the users; and
   wherein the content bridge is a standalone component integrating with the content broker and each of the one or more content providers such that the content broker is required to integrate once only with the content bridge instead of having to integrate individually with every content provider from the one or more content providers.

8. The method of claim 7, wherein the ID mapping process comprises:
if the user has not yet established the second user identifier associating the user to the content provider providing the online contents of which the user is accessing, then:
sending, by the content broker, the request for online content accesses to the content provider providing the online contents of which the user is accessing;
receiving and processing, by the content provider, the request for online content accesses;
creating, by the content provider, the second user identifier associating the user to the content provider providing the online contents of which the user is accessing;
responding, by the content provider, the second user identifier associating the user to the content provider providing the online contents of which the user is accessing;
receiving, by the content bridge, the second user identifier associating the user to the content provider providing the online contents of which the user is accessing; and
storing in a map mapping to the first user identifier, by the content bridge, the second user identifier associating the user to the content provider providing the online contents of which the user is accessing;
otherwise then:
mapping and determining from the first user identifier, by the content bridge, the second user identifier associating the user to the content provider providing the online contents of which the user is accessing;
requesting, by the content bridge, an access token based on the second user identifier associating the user to the content provider providing the online contents of which the user is accessing;
sending, by the content bridge, the request for online content accesses, with the access token, to the one or more content provider providing the online contents of which the user is accessing.

9. The system of claim 7, wherein the users authenticated by the content broker are not challenged for authentication at each of the one or more content providers.

10. The system of claim 1, wherein the authenticating the one or more users by the content broker is implemented with a private open standard and decentralized protocol, enabling social-network functionalities.

* * * * *